United States Patent [19]

Takahashi

[11] Patent Number: 5,727,183

[45] Date of Patent: Mar. 10, 1998

[54] DATA TRANSFER BETWEEN DISK STORAGE AND HOST DEVICE UNDER THE CONTROL OF FILE CONTROL DEVICE EMPLOYING CACHE AND ASSOCIATED BATCH WRITE-BACK OPERATION

[75] Inventor: Naoko Takahashi, Kanagawa, Japan

[73] Assignee: Fujitsu Limited, Kawasaki, Japan

[21] Appl. No.: 615,434

[22] Filed: Mar. 14, 1996

[30]   Foreign Application Priority Data

Mar. 15, 1995 [JP] Japan .................................. 7-056241

[51] Int. Cl.$^6$ .................................................. G06F 12/08
[52] U.S. Cl. .................................. 395/470; 395/440
[58] Field of Search ............................ 395/403, 470, 395/112, 114, 440, 463, 460, 486, 487, 402

[56]   References Cited
U.S. PATENT DOCUMENTS 4,523,206  6/1985  Sasscer ................................. 395/457
5,623,631  4/1997  Tsuboi et al. ......................... 395/470
5,634,109  5/1997  Chen et al. ........................... 395/470
5,636,355  6/1997  Ramakrishnan et al. ............... 395/440

*Primary Examiner*—Matthew M. Kim
*Attorney, Agent, or Firm*—Staas & Halsey

[57]   ABSTRACT

A file control apparatus and a data transferring method that are capable of accessing data within a disk storage device at a much higher speed. The file control apparatus, when there arises a necessity for writing track data within a cache memory back to a disk storage device, writes a series of track data containing that piece of track data and to be written back to the consecutive tracks back to the disk storage device from within the cache memory and stores the effect that each piece of track data that has been written back is data requiring no necessity for the write-back process.

11 Claims, 8 Drawing Sheets

FIG. 3

| BLOCK NUMBER | USABILITY INDICATING FLAG | TRACK NUMBER | WRITE-BACK REQUIREMENT INDICATING FLAG | LRU DATA |
|---|---|---|---|---|
| 1 | 0 | | | |
| 2 | 0 | | | |
| 3 | 0 | | | |
| 4 | 0 | | | |
| | | | | |
| $J_{MAX}$ | 0 | | | |

DATA TRANSFER BETWEEN DISK STORAGE AND HOST DEVICE UNDER THE CONTROL OF FILE CONTROL DEVICE EMPLOYING CACHE AND ASSOCIATED BATCH WRITE-BACK OPERATION

BACKGROUND OF THE INVENTION

1. Field of the Invention

The present invention relates generally to a file control apparatus and a data transferring method. The present invention relates, more particularly, to a file control apparatus provided between a disk storage device and a host device for accessing a file within the disk storage device and to a data transferring method for use with a system constructed of the host device, the disk storage device and a semiconductor memory.

2. Description of the Related Art

A computer system is constructed of a combination of a host device such as a host computer and a disk storage device for permanently storing data that the host device deals with. The disk storage device may involve the use of a disk device such as a magnetic disk device and an magneto-optic disk device for storing a disk medium with the data.

As known well, the disk medium within the disk device is, as illustrated in FIG. 9, formed with a plurality of tracks 22. Each track 22 is segmented into a plurality of sectors 21. Addresses different from each other are allocated to the respective sectors, and the disk device operates upon receiving an address-designated access request. For example, when receiving a read request, in the disk apparatus, a head thereof is moved to above a track corresponding to the address. Thereafter, when the a desired sector comes to a position under the head with rotations of the disk medium, the data stored in that sector is read out.

In this way, according to the disk device, the head is required to move when reading and writing the data, and hence an accessing speed of the disk device is remarkably slower than that of a semiconductor memory.

Under such circumstances, it has been practiced that the computer system has a file control apparatus provided between the host device and the disk storage device so that the host device is capable of accessing the data within the disk storage device at a high speed.

Hereinbelow, a construction and an operation of the prior art file control apparatus will be described with reference to FIG. 10.

As illustrated in FIG. 10, a file control apparatus 53 includes a cache memory 54 and a non-volatile memory 55. The cache memory 54 is a memory for storing data (copy of data) used frequently among pieces of data within the disk storage device 52. The non-volatile memory 55 is a memory provided to cope with an abnormality such as a disconnection of a power supply and so forth. The cache memory 54 and the non-volatile memory 55 are stored with absolutely the same data. A memory area of each memory device is segmented into some blocks each capable of storing one-track data in the disk storage device 52.

The file control apparatus 53 performs a management by knowing which track the data stored on each block relates to (hereinafter referred to as track data) and knowing which track data to change after being read out. Then, the file control apparatus 53 responds to read and write requests given from the host device 51 on the basis of the management contents.

To start with, procedures of responding to the read request will be explained.

When receiving the read request from the host device 51, the file control apparatus 53 checks whether or not the track data about the track including a sector requested of reading (hereinafter called a read requested sector) is stored on one of the blocks within the cache memory 54 on the basis of the address contained in the read request. Then, if the cache memory 54 is stored with such an item of track data, the file control apparatus 53 supplies the host device 51 with the one-sector data about the read requested sector from the cache memory 54 without reading the data out of the disk storage device 52.

Whereas if the cache memory 54 is stored with no track data about the track including the read requested sector, the file control apparatus 53 selects an empty block (stored with no track data) within the cache memory 54 and reads the track data about that track from the disk storage device 52. Then, the file control apparatus 53 stores the selected empty block with the thus read track data. Thereafter, the file control apparatus 53 supplies the host device 51 with the one-sector data about the read requested sector within the cache memory 54 and finishes the response process to the read request.

Further, if no empty block exists, the file control apparatus 53 selects one block used for storing a new item of track data out of the blocks within the cache memory 54. This block is selected based on, e.g., an LRU algorithm and a FIFO algorithm. In the file control apparatus 53 using the LRU algorithm, there is managed a time sequence in which the data on the respective blocks are accessed, and the block accessed in the farthest past is selected as a block for storing the new track data. The file control apparatus 53 employing the FIFO algorithm is stored with the time sequence in which the track data are written to the respective blocks and selects the block to which the track data has been written in the farthest past as a block for storing the new track data.

Then, the file control apparatus 53 decides whether or not the track data on the selected block is track data with its content changed. Subsequently, in the case of the track data with its content changed, the same track data is written back to the disk storage device 52, and the write-back process finished block is stored with a new item of track data. On the other hand, if the track data on the selected block is not changed, the same block is stored with the new track data without writing back the track data.

The content of the track data is changed when the write request is given from the host device. That is, when receiving the write request, the file control apparatus 53 checks whether or not the cache memory 54 has the block stored with the track data about the track including the sector to which the data should be written (referred to as a write requested sector). Then, if the cache memory 54 has such a block, the file control apparatus 53 rewrites the data corresponding to the write requested sector with data supplied from the host device 51. Subsequently, the file control apparatus 53 stores the effect that the track data on that block has been changed and finishes the response process to the read request. Whereas if there exists no block stored with the track data about the write requested sector, the file control apparatus 53 writes the data requested of writing to the write requested sector in the disk storage device 52 and finishes the response process to the write request.

Thus, according to the system using the file control apparatus 53, the write request and the read request concerning the data requested of reading are treated as the access request to the cache memory 54 conceived as the semiconductor memory, and, therefore, the accessing speed, to the disk storage device 52, of the host device 51 is increased.

The prior art file control apparatus 52 was, however, incapable of making sufficient use of the function of the disk storage device 52.

For instance, when all the blocks in the cache memory 54 are stored with the track data the contents of which were changed, the host device 51 starts reading a file where the data are stored on the consecutive sectors on a track L and a track L+1. In this case, the disk storage device 52 is controlled in the following manner by the file control apparatus 53. Incidentally, it is assumed that the track data about the track L and the track L+1 are not stored in the cache memory 54.

In this instance, the file control apparatus 53, when receiving the read request about the first sector of the file, commands the disk storage device 52 to write back one piece of track data within the cache memory 54, e.g., the track data concerning a track K. Accordingly, in the disk storage device 52, the head moves to above the track K and writes the one-track data.

Subsequently, the file control apparatus 53 indicates the disk storage device 52 to read the track data about the track L. As a result, in the disk storage device 52, it follows that the head moves from the track K to above the track L and read the track data about the track L.

Thereafter, the file control apparatus 53 successively responds the respective read requests to the sectors on the track L by making use of the track data on the track L prepared within the cache memory 54. Then, the file control apparatus 53, when receiving the read request relative to the sector on the track L+1, commands the disk storage device 52 to write back the track data about, e.g., a track M and to read the track data stored on the track L+1. Therefore, in the disk storage device 52, the head at first moves from the track L to above the track M and write the track data about the track M. Next, it follows that the head moves from the track M to above the track L+1 and reads the track data about the track L+1.

As described above, according to the prior art file control apparatus 53, even when reading the series of data stored on the consecutive tracks, it happens that the head largely moves within the disk storage device 52.

SUMMARY OF THE INVENTION

It is a primary object of the present invention to provide a file control apparatus and a data transferring method that are capable of accessing data within a disk storage apparatus at a higher speed.

It is another object of the present invention to provide a file control apparatus and a data transferring method that are capable of making effective use of a memory area in a disk storage device.

According to a first aspect of the present invention, a file control apparatus is provided between a disk storage device and a host device for accessing data in the disk storage device. The file control apparatus comprises a storing unit, a first read request responding unit, a second read request responding unit, a write request responding unit and a batch write-back unit.

The storing unit has a predetermined number of blocks for storing track data consisting of plural pieces of sector data and is used for storing the data exhibiting a high using frequency among pieces of track data stored in the disk storage device.

The first read request responding unit operates, when receiving a read request from the host device, and if the storing unit is stored with the sector data about a read requested sector requested of reading with respect to the read request therefrom, and supplies the host device with the sector data within the storing unit.

The second read request responding unit, when receiving the read request from the host device, and if the storing unit is not stored with the sector data about the read requested sector requested of reading with respect to the read request therefrom, operates in the manner described as below. The second read request responding unit at first reads the track data containing the sector data about the read requested sector from the disk device, and stores an empty block within the storing unit with the read track data. Next, the second read request responding unit supplies the host device with the sector data about the read requested sector that is contained in the track data.

The write-back request responding unit, when receiving a write request from the host device, and if the storing unit is stored with the sector data about a write requested sector requested of writing with respect to the write request therefrom, rewrites the sector data with data requested to be written and stores the effect that the track data containing the sector data are the track data required to be written back.

Then, the batch write-back unit, when making a response to the read request given by the second read request responding unit in a state where the storing unit has no empty block, operates as follows. The batch write-back unit at first selects one block that is to be an empty block in accordance with a predetermined rule. Then, the batch write-back unit writes, if the selected block is stored with the track data required to be written, a series of track data containing the above track data and to be written back to the consecutive tracks within the storing unit back to the disk storage device and stores the effect that each piece of track data which has been written back is data requiring no write-back process.

According to the thus constructed file control apparatus of the present invention, the disk storage device is controlled so that a total moving quantity of the head is smaller than by the prior art file control apparatus. Therefore, in the case of using the present file control apparatus, the host device is capable of accessing the data within the disk storage device at a higher speed.

According to the present invention, the batch write-back unit may involve the use of a batch write-back unit constructed of a combination of a block selecting unit, a retrieving unit, a disk storage device, a control unit and an abnormality occurrence notifying unit. Note that the block selecting unit, when making the response to the read request given by the second read request responding unit in the state where the storing unit has no empty block, selects one block that is to be an empty block in accordance with the predetermined rule. The retrieving unit, if the block selected by the block selecting unit is stored with the track data required to be written back, retrieves the series of track data containing the track data and to be written back to the consecutive tracks from the storing unit. The disk storage device control unit indicates the disk storage device to write the series of track data retrieved by the retrieving unit and supplies the disk storage device with the series of track data. The abnormality occurrence notifying unit, when outputting a notice showing that the disk storage device could not normally write the data, notifies the host device of an occurrence of abnormality.

In the case of adopting the thus constructed batch write-back unit, the track data for a plurality of tracks are written back at the highest speed. Hence, when using the file control apparatus adopting this construction, the host device is capable of accessing the data within the disk storage device at a much higher speed.

Further, in the case of taking the above-constructed batch write-back unit, it is desired that there be added an individual write-back indicating unit, when outputting the notice showing that the disk storage device could not normally write the data, outputs, to the disk storage device, a write indication to write each piece of the series of track data retrieved by the retrieving unit and an individual write-back unit which operates as below. Note that in this case the abnormality occurrence notifying unit is constructed to notify the host device of the occurrence of abnormality after the individual write indicating unit has operated.

When constructing the file control apparatus in this way, there is no possibility in which the tracks actually possible of write-back processing are treated as tracks impossible of write-back processing (so-called write pending tracks). Therefore, according to this file control apparatus, it follows that the memory area of the disk storage device can be efficiently used.

Further, when adopting the above-constructed batch write-back unit, an obtaining unit and an individual write indicating unit that operate as below may be added to the batch write-back unit. The obtaining unit, when outputting the notice showing that the disk storage device could not normally write the data, obtains, from the disk storage device, a piece of track specifying data for specifying the track where the data could not normally be written. The individual write indicating unit outputs, to the disk storage device, a write indication to write the respective pieces of track data subsequent to a track next to the track specified by the track specifying data obtained by the obtaining unit among the series of track data retrieved by the retrieving unit.

When constructing the file control apparatus in this manner, it is possible to prevent the data from being written again to the track where the write-back process has succeeded when the disk storage device control unit operates.

Added additionally to the file control apparatus according to the present invention are a standby system second read request responding unit having the same construction as that of the second read request responding unit and operating when the abnormality happens in the second read request responding unit and a standby system batch write-back unit having the same construction as that of the batch write-back unit and operating when the abnormality happens in the batch write-back unit. With those additions, the file control apparatus exhibiting a remarkably high reliability can be thereby attained.

A data transferring method according to the present invention is a method used for transferring data between a disk storage device, a host device for accessing the data in the disk storage device and a memory device having a predetermined number of blocks for storing track data consisting of plural pieces of sector data.

The data transferring method according to the present invention comprises a first read request responding step, a second read request responding step, a write request responding step and a batch write-back step.

The first read request responding step is to supply, when receiving a read request from the host device, the host device with the sector data within the memory device if the memory device is stored with the sector data about a read requested sector requested of reading with respect to the read request therefrom. The second read request responding step is, when receiving the read request from the host device, and if the memory device is not stored with the sector data about the read requested sector requested of reading with respect to the read request therefrom, to read the track data containing the sector data about the read requested sector from the disk device, store an empty block within the memory device with the read track data and supply the host device with the sector data about the read requested sector that is contained in the track data. The write-back request responding step is, when receiving a write request from the host device, and if the memory device is stored with the sector data about a write requested sector requested of writing with respect to the write request therefrom, to rewrite the sector data with data requested of writing and store the effect that the track data containing the sector data are the track data required to be written back. Then, the batch write-back step is, when making a response to the read request in the second read request responding step in a state where the memory device has no empty block, to select one block that is to be an empty block in accordance with a predetermined rule, write, if the selected block is stored with the track data required to be written, a series of track data containing the above track data and to be written back to the consecutive tracks within the memory device back to the disk storage device and store the effect that each piece of track data which has been written back is data requiring no write-back process.

According to this data transferring method, the disk storage device is controlled to reduce the total moving quantity of the head, and hence the host device is capable of accessing the data within the disk storage device at the high speed.

According to the present invention, the batch write-back step may include a block selecting step, a retrieving step, a disk storage device control step and an abnormality occurrence notifying step. In these steps, the following processes are executed. The block selecting step is, when making the response to the read request in the second read request responding step in the state where the memory device has no empty block, to select one block that is to be an empty block in accordance with the predetermined rule. The retrieving step is, if the block selected in the block selecting step is stored with the track data required to be written back, to retrieve the series of track data containing the track data and to be written back to the consecutive tracks from the memory device. The disk storage device control step is to indicate the disk storage device to write the series of track data retrieved in the retrieving step and supply the disk storage device with the series of track data. Then, the abnormality occurrence notifying step is, when outputting a notice showing that the disk storage device could not normally write the data, to notify the host device of an occurrence of abnormality.

In case the batch write-back step includes the above-mentioned steps, there can be added an individual write indicating step of, when outputting the notice showing that said disk storage device could not normally write the data, outputting, to the storage device, a write indication to write each piece of the series of track data retrieved in the retrieving step. In this case, however, the abnormality occurrence notifying step is to be executed after executing the individual write indicating step.

Further, the batch write-back step includes the above-mentioned steps, there may be added an obtaining step of, when outputting the notice showing that the disk storage device could not normally write the data, obtaining, from the disk storage device, a piece of track specifying data for specifying the track where the data could not normally be written and an individual write indicating step of outputting, to the disk storage device, a write indication to write the respective pieces of track data subsequent to a track next to the track specified by the track specifying data obtained in the obtaining step among the series of track data retrieved in the retrieving step.

BRIEF DESCRIPTION OF THE DRAWINGS

Other objects and advantages of the present invention will become apparent during the following discussion in conjunction with the accompanying drawings, in which:

FIG. 3 is an explanatory diagram showing an outline of a memory management table provided in the file control apparatus in the first embodiment;

DETAILED DESCRIPTION OF THE PREFERRED EMBODIMENTS

The present invention will hereinafter be specifically discussed with reference to the accompanying drawings.

<First Embodiment>

Figure 1:
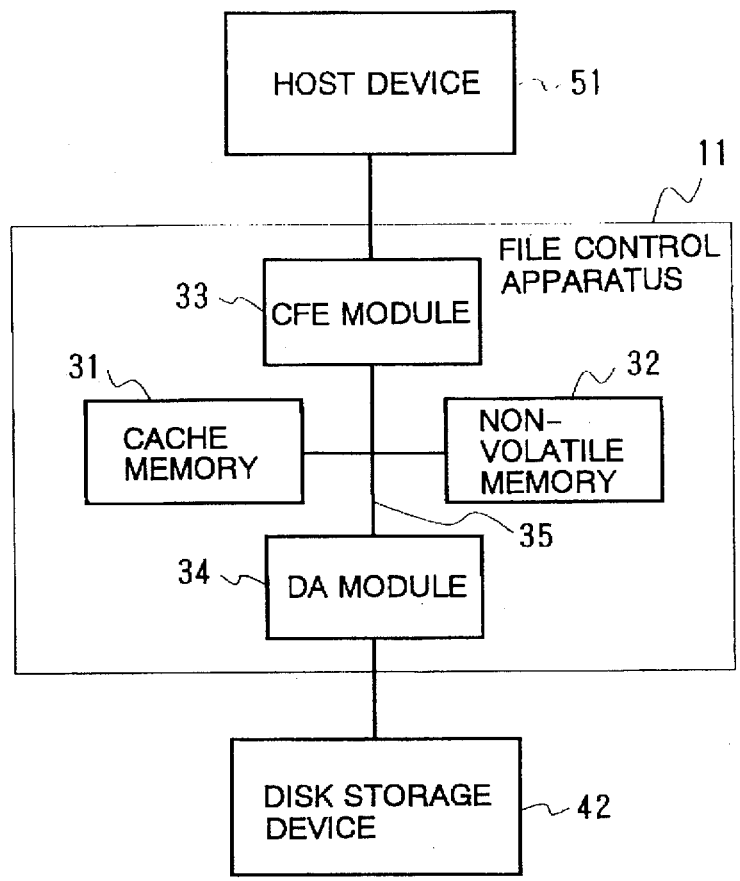
FIG. 1 is a block diagram illustrating a construction of a file control apparatus in a first embodiment of the present invention.

FIG. 1 illustrates a construction of a file control apparatus in a first embodiment of the present invention. As illustrated in FIG. 1, a file control apparatus 11 in the first embodiment is, when used, connected to a host device 51 such as a host computer and a rewritable disk storage device 52.

The file control apparatus 11 includes a cache memory 31, a non-volatile memory 32, a cache function engine (CFE) module 33 and a device adaptor (DA) module 34. The respective constructive units are connected to each other through a bus 35.

Figure 2:
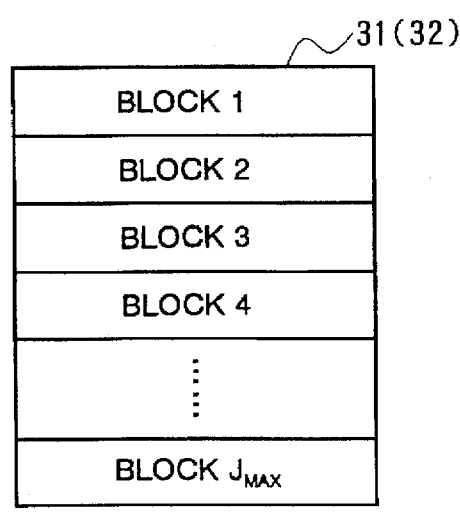
FIG. 2 is an explanatory diagram showing a method of suing a memory area of each of a cache memory and a non-volatile memory.

The cache memory 31 and the non-volatile memory 32 are used for storing data in the disk storage device 52 on a track-basis. Memory areas of the two memories are, as schematically illustrated in FIG. 2, segmented into $J_{MAX}$ pieces of blocks each capable of storing one-track data (hereinafter referred to as track data).

The DA module 34 is a module in charge of controlling the disk storage device 52 and writes the data to the disk storage device 52 or reads the data from the disk storage device 52 in accordance with an indication given from the CFE module 33. Contents of specific operations of the DA module 34 will be described hereinbelow.

The CFE module 33 is a module for controlling the individual components within the file control apparatus 11 in an integrative manner and holds a non-volatile memory (unillustrated) for storing a memory management table.

FIG. 3 shows and outline of the memory management table. The memory management table is a table for managing using states of the individual blocks within the cache memory 31. As shown in FIG. 3, the memory management table is stored with a block number, a usability indicating flag, a track number, a write-back requirement indicating flag and LRU (Least Recently Used) data.

The block number is defined as a piece of data for specifying one block within the cache memory 31. The usability indicating flag is flag data for giving a "1" or "0" indication as to whether or not the track data is stored in the block specified by a corresponding block number. The track number is data for indicating which track within the disk storage device 52 the track data held in the corresponding block relates to. The write-back requirement indicating flag is flag data for indicating whether or not the track data in the corresponding block is changed by use of "1" and "0". The write-back requirement indicating flag is used for deciding whether the write-back of the track data is needed or not. The LRU data is a piece of data used for selecting which block to store a new piece of track data.

According to the present apparatus, when the data is stored in a certain block within the cache memory 31, the same data is stored in the corresponding block within the non-volatile memory 32. Therefore, if the data within the cache memory 31 are lost when a power supply is disconnected during the operation, states of the respective constructive units can revert to the previous states before the disconnection of the power supply on the basis of the track data stored in the non-volatile memory 32 as well as on the data stored in the memory management table.

The CFE module 33 responds data read/write requests from the host device 51 by controlling the individual constructive units while referring to and updating the contents of this memory management table.

At the first onset, the operation of the CFE module 33 in response to the data read request will be explained.

Figure 4:
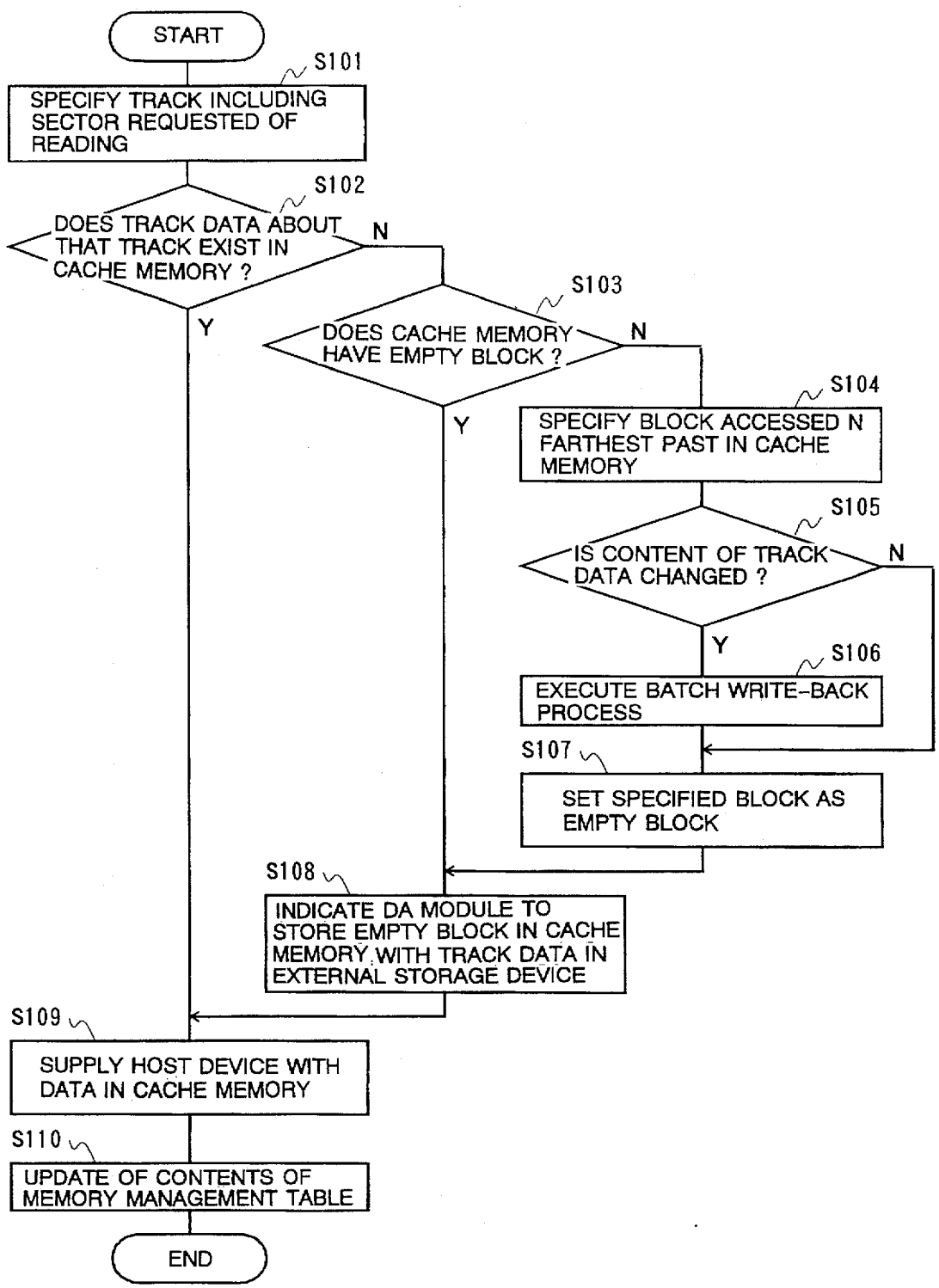
FIG. 4 is a flowchart showing operating procedures when in a response process to a read request in the file control apparatus in the first embodiment.

FIG. 4 shows operation procedures of the CFE module 33 when receiving the data read request from the host device 51. Note that a set of block-number-X related data consisting of the usability indicating flag, the track number, the write-back requirement indicating flag and the LRU data are referred to as block-number-X related memory management data in the following discussion. Further, for an explanatory convenience, there shall be omitted a description of the data write process to the non-volatile memory 32, which is to be executed simultaneously when writing the data to the cache memory 31.

As illustrated in the Figure, when receiving the data read request from the host device 51, the CFE module 33 at first specifies the track number of the track where a sector exists, from which the content is read on the basis of an address contained in the read request (step S101). Subsequently, the CFE module 33 decides whether or not the track data identified by the specified track number exists in the cache memory 31 by referring to the contents of the memory management table (step S102). More specifically, the CFE module 33 decides whether or not the memory management data having the usability indicating flag of "1" and containing the track number coincident with the specified track number exists.

Then, if the above memory management data exists, the CFE module 33 decides that the track data of the specified track number is stored in the cache memory 31 (step S102; Y) and supplies the host device 51 with the data within the cache memory 31 (step S109). That is, the CFE module 33 supplies the host device 51 with the sector-basis data conceived as part of the track data of the specified track number, which data is stored in the cache memory 31.

Next, the LRU data among items of memory management data about the block stored with the track data used for responding to the read request is rewritten into data giving an indication of being accessed latest (step S110), and a response process to the read request is finished.

On the other hand, if the track data about the specified track is not stored in the cache memory 31 (step S102; N), the CFE module 33 decides whether an empty block (that is not yet used for storing the track data) usable for storing the new track data exists in the cache memory 31 (step S103). To be more specific, the CFE module 33 decides whether the empty block exists or not by checking the existence of the memory management data with the usability indicating flag of "0" in this step.

Then, the CFE module 33, if the empty block exists (step S103; Y), reads the track data about the track number specified in step S101 from the disk storage device 52 and gives an indication to store the empty block in the cache memory 31 with the track data (step S108). Note that the indication given by the CFE module 33 includes the data indicating that the one-track data be read, the track number to be read and the block number of the block for storing the track data about that track number in step S108.

The DA module receiving the same indication requests the disk storage device 52 to read the track data stored on the track having the track number given from the CFE module 33. Then, the DA module 33 stores the block of the block number given from the CFE module 33 with the track data outputted by the disk storage device 52 in response to that request and outputs a notice of a normality end to the CFE module 33.

The CFE module 33, when receiving the notice of the normality end from the DA module 34, executes the processes subsequent to step S109. That is, the CFE module 33 reads the data on the sector requested of reading among pieces of track data newly stored in the cache memory 31 and supplies the host device 51 with the read data (step S109). Subsequently, the track number, etc. is set in the memory management data about the block stored with the new track data (step S110), and the response process to the read request comes to an end.

Whereas if no empty block exists in the cache memory 31 (step S102; N), the CFE module 33 specifies one block accessed in the most recent past on the basis of the LRU data as one item of the memory management data (step S104). Next, the CFE module 33 checks whether or not "1" is set in the write-back requirement indicating flag relative to that block and thereby decides whether or not the content of the track data within that block is changed (step S105). It is to be noted that the CFE module 33 also reads the track number about the target block in this step.

Then, if the content of the track data in the block specified in step S104 is changed (step S105; Y), the CFE module 33 executes a batch write-back process (step S106). The batch write-back process will be hereinafter be explained in greater detail. In this process, however, the track data in some blocks inclusive of the block specified in step S104 are to be written back to the disk storage device 52.

After a completion of the batch write-back process (step S106), or if the content of the track data in the block specified in step S104 is not changed (step S105; N), the CFE module 33 changes the usability indicating flag relative to the block specified in step S104 to "0", thereby making that block empty (step S107). Subsequently, the processes after step S108 are to be executed with respect to that empty block, and the response process to the read request is finished.

Next, a response process to a write request will be explained.

As illustrated in the Figure, when receiving the write request, the CFE module 33 specifies the track number of the track containing the sector to which the data should be written on the basis of an address (hereinafter referred to as a write address) contained in the write request (step S201). Subsequently, the CFE module 33 checks whether or not the track data on the track having the specified track number is stored in the cache memory 31 by referring to the contents of the memory management table (step S202).

If the track data on the specified track is stored in the cache memory 31 (step S202; Y), i.e., if the track data containing the write address data exists, the CFE module 33 rewrites the data in a position corresponding to the write address of the track data with a piece of data requested of writing (step S204). Subsequently, "1" is set to the write-back requirement indicating flag about the block stored with the rewritten track data within the memory management table (step S205), thus finishing the response process to the write request.

On the other hand, if the track data of the track containing the sector requested of writing is not stored in the cache memory 31 (step S202; N), the CFE module 33 notifies the DA module 34 of the write address and supplies this module with the data requested of writing (step S203). Then, the CFE module 33, upon a completion of the data writing process by the DA module 34, finishes the response process to the write request.

Figure 6:
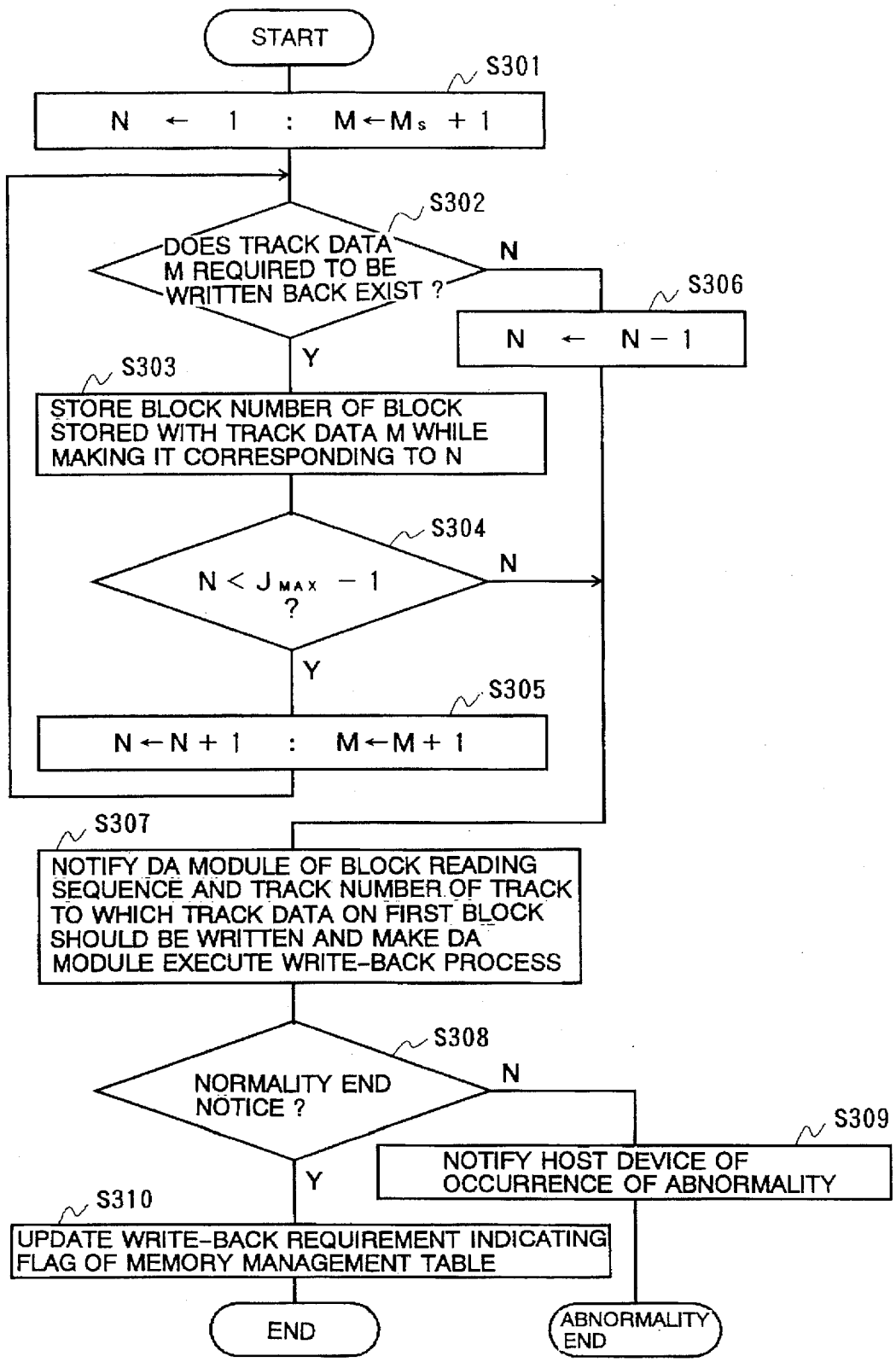
FIG. 6 is a flowchart showing operating procedures when in a batch write-back process in the file control apparatus in the first embodiment.

Hereinbelow, the batch write-back process will be mentioned in greater detail with reference to FIG. 6.

As discussed with reference to FIG. 4, when starting the batch write-back process, the CFE module 33 holds the block number for specifying one block within the cache memory 31 and the track number of the track data stored in that block, which data should be written back. In the following discussion, the block number and the track number that are held when starting the batch write-back process are expressed by $J_S$, $M_S$, respectively.

As illustrated in the Figure, the CFE module 33 at first sets "1" to a variable N and sets a sum of "1" of the track number $M_S$ to a variable M (step S301). Note that the variable N is a variable for counting the number of pieces of track data to be written back together with the track data in the block having the block number $J_S$.

Next, the CFE module 33 checks whether or not the track data about the track number M (indicated by the track data M in the Figure) and required to be written back is stored in the cache memory 31 (step S302). Then, if such track data is stored therein (step S302; Y), the block number of the block stored with that piece of track data is stored correspondingly to N (step S303).

Next, the CFE module 33 compares N with $J_{MAX}-1$ in magnitude (step S304). Note that $J_{MAX}$ presents the number of blocks existing in the cache memory 31. Then, the CFE module 33, if $N<J_{MAX}-1$ established (step S304; Y), adds "1" to the variable N and the variable M as well (step S305) and returns to step S302.

The CFE module 33 repeats such a loop, and, if the write-back required track data about the track number M is not stored in the cache memory 31 (step S302; N), N is decremented by "1" (step S306). Then, the CFE module 33 proceeds to step S307. Whereas if $N<J_{MAX}-1$ is not established (step S304; N), i.e., if $N=J_{MAX}-1$ is established, the CFE module 33 proceeds to step S307 without changing a value of N.

In step S307, the CFE module 33 notifies the DA module 34 of a reading sequence of the blocks within the cache memory 31 and the track number of the track to which the track data should be written and makes the DA module 34 execute the write of the track data in respective blocks back to the disk storage device 52. That is, the CFE module 33 indicates the DA module 34 to read first the content of the block having the block number JS and thereafter reads the contents of the blocks of the respective block numbers stored corresponding to 1–N in step S309 in the sequence of numerical values set corresponding thereto. Further, the CFE module 33 notifies the DA module 34 of the track number MS as a track number of the track to which the track data in the first block should be written.

The DA module 34 receiving such a notice informs the disk storage device 52 of an execution to write the data for (N+1) tracks beginning from the head sector of the track MS. Thereafter, the DA module 34 sequentially supplies the disk storage device 52 with the track data in the respective blocks within the cache memory 31 in accordance with the reading sequence given from the CFE module 33.

In response to this operation of the DA module 34, the disk storage device 52 executes writing the data to consecutive (N+1)-pieces of tracks beginning from the track MS. Then, the disk storage device 52, when the writing of the data on all the tracks has been normally finished, notifies the DA module 34 of this effect. Further, the disk storage device 52, if the writing process of the data on one of those tracks fails to perform, notifies the DA module 34 of the failure in sequentially writing the data on the tracks. Further, the DA module 34 also informs the CFE module 33 of the notified content given from the disk storage device 52.

The CFE module 33 gives the write-back indication corresponding to the result obtained in steps S302–S305 to the DA module 34 and thereafter shifts to a status of waiting for the notice from the DA module 34. Then, the CFE module 33, when receiving the notice showing the normality end from the DA module 34 (step S308; Y), sets "0" to the write-back requirement indicating flag relative to the (N+1)-pieces of blocks where the data have been written back and finishes the batch write-back process (proceeds to step S107 in FIG. 5).

On the other hand, the CFE module 33, when receiving the notice indicating an abnormality end from the DA module 34 (step S308; N), informs the host device 51 of an occurrence of the abnormality (step S309) and shifts to a status of waiting for a command from the host device 51 (makes an abnormality end).

Note that the CFE module 33, though not clearly shown in the flowchart, also executes a process of memorizing that the series of batch write-back processing target tracks are the tracks where the data can not be written back (write-back pending tracks).

Then, when in the command standby status, the CFE module 33, upon inputting the command for indicating an execution of the substitution process, controls the disk storage device 52 through the DA module 34 and thereby carries out the substitution process with respect to each of the write-back pending tracks. Thereafter, the CFE module 33 executes the processes subsequent to step S310.

Further, the CFE module 33, in the case of inputting the command to indicate that the processing to the write-back pending tracks be effected afterward during the command standby, returns to step S104 of FIG. 4 and specifies (selects) one block. On this occasion, the CFE module 33 selects one block among the blocks from which the blocks stored with the tack data about the write-back pending tracks are removed.

The operation of the file control apparatus in the first embodiment will hereinafter be described more specifically. Herein, it is assumed that the file control apparatus 11 includes the cache memory 31 having five blocks. It is also assumed that the blocks 1–5 be respectively stored with the track data having changed contents relative to tracks $K_A$, $K_A+1$, $K_B$, $K_B+1$, $K_B+2$. Under such circumstances, it is considered that there starts a process requiring files stored on tracks L–L+1 in the host device 51. That is, it is considered that the host device 51 sequentially issues the read requests about the sectors on the tracks L–L+1. In this case, the CFE module 33 and the disk storage device 52 operate as follows.

Figure 5:
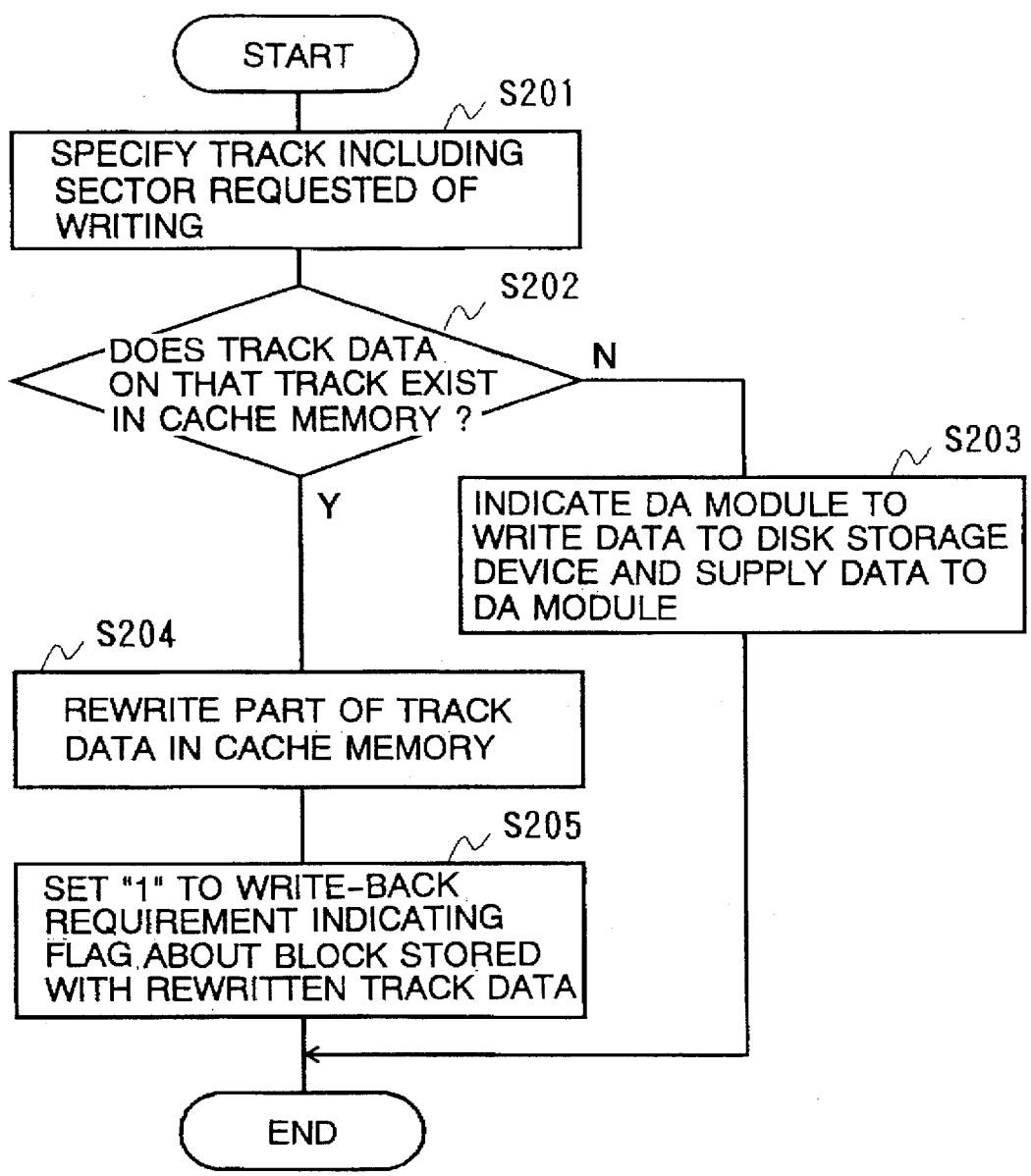
FIG. 5 is a flowchart showing operating procedures when in a response process to a write request in the file control apparatus in the first embodiment.

The CFE module 33, when receiving the read request about the first sector, as explained referring to FIG. 5, at first recognizes the necessity for the track data about the track L on the basis of the address contained in that read request. Next, the CFE module 33 checks whether or not the track data about the track L exists in the cache memory 31. If the cache memory 31 assumes a status as mentioned above, the CFE module 33 executes a branch-off to the "N" side in steps S102, S103.

Thereafter, in step S104, the CFE module 33 sets one block, e.g., a block 1 stored with the track data about the track $K_A$ as a block for storing the track data abut the track L. Note that if the track data about the tracks $K_A-K_{A+1}$ are defined as data about one file, generally the block stored with the track data relative to the track $K_A$ is a block accessed in most recent past.

After selecting the block 1 stored with the track data about the track $K_A$, the CFE module 33 starts the batch write-back process because of the content of the same track data being changed.

As explained with reference to FIG. 7, when performing the batch write-back process, the CFE module 33 sequentially examines existences of to-be-written-back track data about the tracks continued from the track $K_A$. In this case, all items of track data within the cache memory 31 are the to-be-written-back track data, and one item of track data among those items of track data is the track data relative to the track continued from the track $K_A$. Therefore, the CFE module 33, when N=2, exits a loop of steps S302–S305 and, after subtracting "1" from N, executes step S307. In step S307, the CFE module 33 commands the DA module 34 to write the track data stored in the blocks 1, 2 back to the two tracks beginning from the track $K_A$.

The DA module 34 receiving such an command indicates the disk storage device 52 to write the data to a memory area for two tracks beginning from the track $K_A$. Thereafter, the DA module 34 sequentially supplies the disk storage device 52 with the two-track data in the cache memory 31.

The disk storage device 52 moves the head to above the track $K_A$ from the head then-positioned track $K_X$ to write the supplied data on the two tracks beginning from the track $K_A$.

Then, the disk storage device 52 notifies the CFE module 33 of whether or not the writing process has been normally completed through the DA module 34.

When receiving a notice of the abnormality end, the CFE module 33 informs the host device 51 of an occurrence of the abnormality and shifts to a status of waiting for an input of the command.

When receiving a notice of the normality end, the CFE module 33 changes, to "0", the write-back requirement indicating flag relative to the block stored with each item of write-back finished track data and thus finishes the batch write-back process. Thereafter, the CFE module 33 makes the block 1 empty by setting the usability requirement indicating flag about the block 1 to "0" and indicates the DA module 34 to read the track data from the track L with respect to that empty block.

The DA module 34 outputs a read request to the disk storage device 52 in accordance with the given indication. The disk storage device 52 receiving the read request moves the head to above the track L and read the data from the track L. The DA module 34 stores the empty block in the cache memory 31 with the track data outputted by the disk storage device 52. The DA module 34 also reads the data about the requested sector among those pieces of track data and supplies the host device 51 with the sector data.

Thereafter, the CFE module 33 responds to the read request relative to the sector that is contained in the subsequent track L by supplying the host device 51 with the data in the cache memory 31.

Then, the CFE module 33, when first receiving the read request relative to the sector that is contained in the track L+1, specifies one block for storing the track data about the track L+1 as in the case of first receiving the read request relative to the sector that is contained in the track L. In this case, it follows that the block 2 stored with the track data about the track $K_A+1$ are to be specified. However, that item of track data is the track data that is not required to be written back, and, therefore, the CFE module 33 commands the DA modules 34 to read the track data about the track L+1 without executing the write-back process of the track data. Hence, in the disk storage device 52, the head just moves from the track L to the track L+1 and reads the track data about the track L+1.

That is, according to the present file control apparatus 11, in the disk storage device 52, the head just moves from the track $K_X$ to the track $K_A$ and further to the next track $K_A+1$ and from the track $K_A+1$ to the track L and further to the next track L+1, thereby completing the response process to the request given from the host device 51.

In contrast with this, according to the prior art file control apparatus, as stated previously, the write-back process is effected for only one track. Accordingly, in the system using the conventional file control apparatus, if there occurs the same situation as the one explained herein, in the disk storage device, it follows that each time the read or write request is made, the heads moves from the track on which the head is located at that time to the tracks apart therefrom. (The head moves in a sequence such as $K_X \to K_A \to L \to K_A+1 \to L+1$).

Thus, according to the file control apparatus in the first embodiment, as compared with the prior art file control apparatus, the disk storage device 52 is controlled to reduce a total moving quantity of the head. Therefore, in the case of employing the present file control apparatus, the host device 51 becomes capable of accessing the data within the disk storage device 52 at a high speed.

Note that the file control apparatus in the first embodiment is constructed to, if the to-be-written-back track data about the consecutive tracks exist, write back all of those pieces of track data irrespective of the storage sequence in the cache memory. However, if the to-be-written-back track data about the consecutive tracks exist in the consecutive blocks within the cache memory, the file control apparatus may be constructed to write back those pieces of track data. If constructed in this way, the DA module 34 may involve the use of a simply constructed module.

<Second Embodiment>

According to the file control apparatus in the first embodiment, if the abnormality happens on the side of the disk storage apparatus during the batch write-back process, the CFE module 33 informs the host device (the user of the host device) of the occurrence of the abnormality and shifts to the status of waiting for the command input. Further, the file control apparatus in the first embodiment deals with a series of batch write-back processing target tracks as the write-back pending tracks.

Hence, if the user receiving the above notice given an indication of the substitution process, it follows that the substitution process is effected on even the normally usable tracks, with the result that the memory areas of the disk storage device 52 are to be used in futility.

The file control apparatus in a second embodiment is a modified version of the file control apparatus in the first embodiment in order to obviate the above problems. According to the file control apparatus in the second embodiment, when the abnormality happens during the batch write-back process, an individual write-back process is to be executed. Further, the file control apparatus in the second embodiment can be connected to two sets of host devices and two sets of disk storage devices and is, besides, constructed as an apparatus having a redundancy structure.

Figure 7:
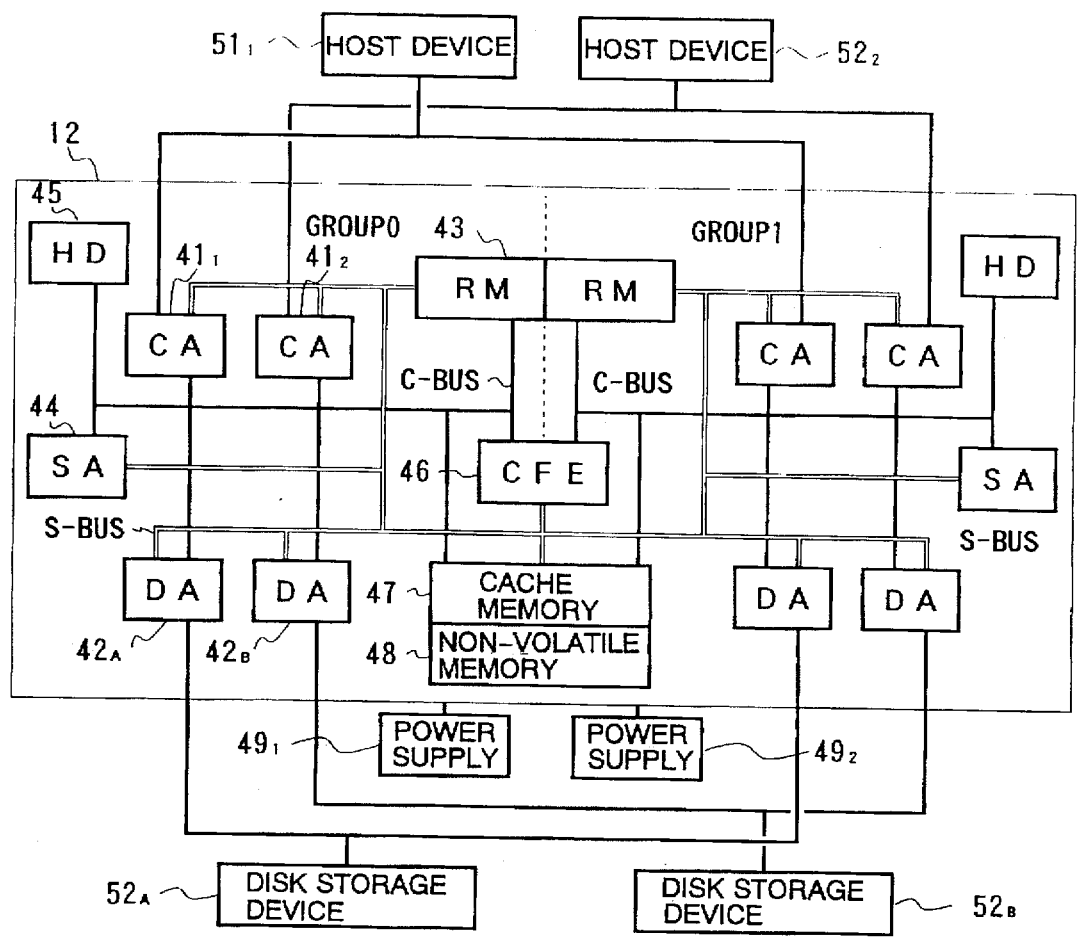
FIG. 7 is a block diagram showing a construction of the file control apparatus in a second embodiment.
Figure 8:
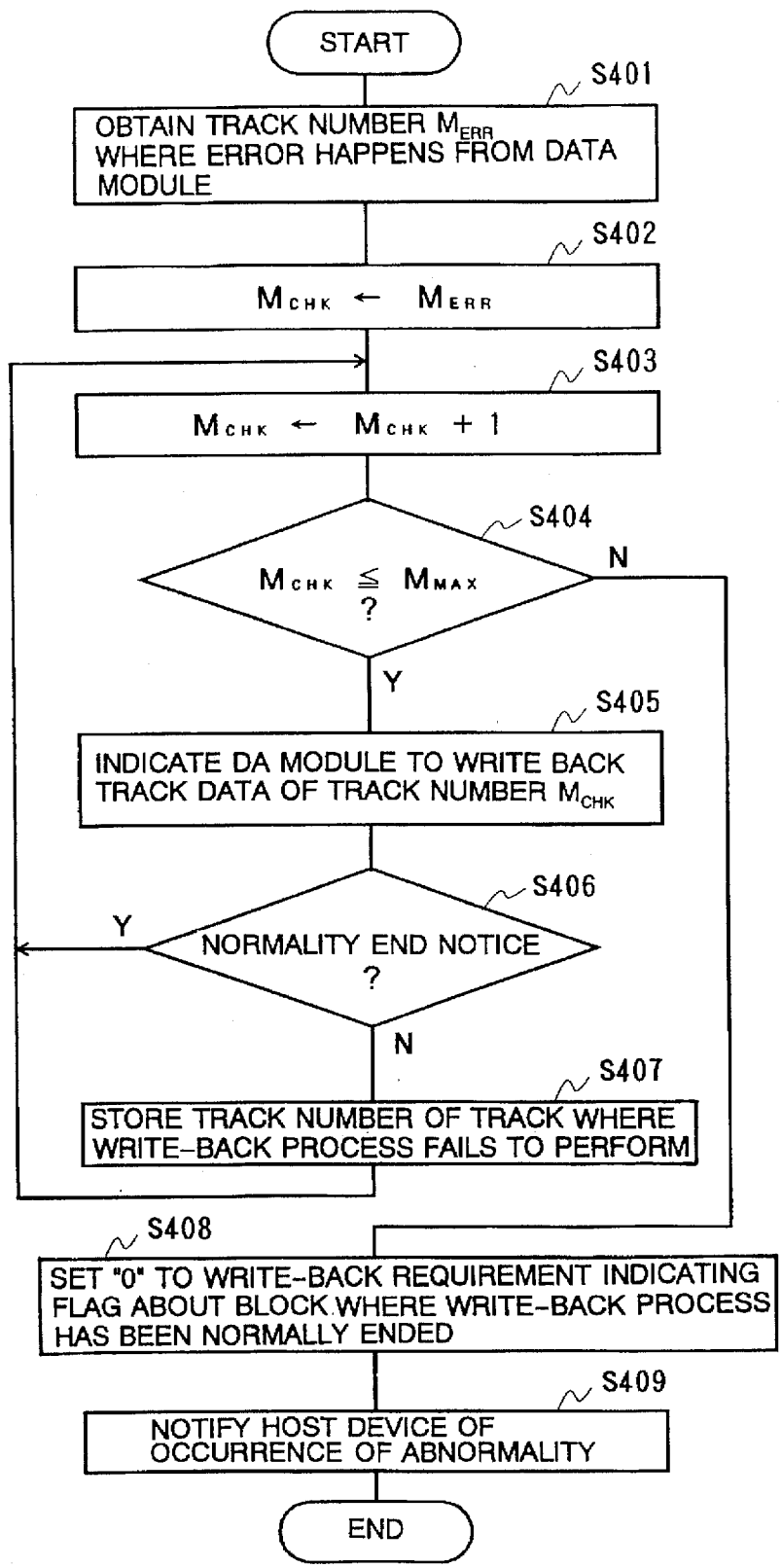
FIG. 8 is a flowchart showing operating procedures when in an individual write-back process in the file control apparatus in the second embodiment.

FIG. 7 illustrates a construction of the file control apparatus in the second embodiment. As shown in FIG. 7, a file control apparatus 12 comprises two-system file control mechanisms (GROUP0, GROUP1). Each file control mechanism includes channel adaptor (CA) modules $41_1$, $41_2$, device adaptor (DA) modules $42_A$, $42_B$, a resource manager (RM) module 43, a service adaptor (SA) module 44, a hard disk device (HD) 45, a cache function engine (CFE) module 46, a cache memory 47 and a non-volatile memory 48. Among them, the cache function engine (CFE) module 46, the cache memory 47 and the non-volatile memory 48 are shared with the two file control mechanisms. The respective constructive units are connected to each other via C-BUS and S-BUS. Further, two-system power supplies $49_1$, $49_2$ are connected to the file control apparatus 12. The file control apparatus 12 is constructed to normally operate as far as one of the power supplies normally functions.

In the present file control apparatus 12, generally the file control mechanism marked with GROUP0 functions, but, when the abnormality happens in the respective constructive units, the file control mechanism marked with GROUP1 starts functioning.

The SA module 44 examines whether or not the respective constructive units function normally. Further, the SA module 44, when the file control apparatus 12 is actuated, also initializes the respective constructive units on the basis of a program stored in the hard disk device HD 45.

The DA modules $42_A$, $42_B$ are modules for respectively controlling disk storage devices $52_A$, $52_B$ and operate in accordance with the indications given from the CFE module 46. Note that the DA module 42 is the same module as the DA module 34 of the file control apparatus 11 in the first embodiment.

The CA modules $41_1$, $41_2$ are modules serving as interfaces with the host devices $51_1$, $51_2$. The CA module 41, when receiving the read or write request from the host device 51, informs the RM module 43 of this receipt of request. The RM module 43 performs a so-called arbitration with respect to the notification from each CA module 41 and determines which CA module 41 to execute the operation responding to the received request. Further, the RM module 43 makes a management by knowing which file each CA module 41 is accessing and controls the respective constructive units so that the same file is not accessed by the two host devices 51. For example, when the CA module $41_2$ receives an access request to the file that is being accessed by the CA module $41_1$, a signal for rejecting that request is outputted to the CA module $41_2$.

The memory area of each of the cache memory 47 and of the non-volatile memory 48 is largely divided into two memory area for the disk storage devices $52_A$, $52_B$. The memory area for each device is further subdivided into a plurality of blocks capable of storing the track-basis data. The cache memory 47 and the non-volatile memory are respectively used for the same applications as those of the cache memory 31 and the non-volatile memory 32 in the first embodiment.

The CFE module 46 is a module for controlling the respective constructive units in the file control apparatus 12 in the integrative manner. The CFE module 46 holds a memory management table for managing the using states of the individual blocks for the disk storage device $52_A$ in the cache memory 47 (and the non-volatile memory 48) and a memory management table for managing the using states of the respective blocks for the disk storage device $52_B$. Each memory management table has the same structure as that of the memory management table in the first embodiment explained with reference to FIG. 3.

The CFE module 46 specifies the disk storage device 52 to be accessed on the basis of the read or write request received by the CA module 41 and executes the response process to each request by use of the memory management table relative to the specified disc storage device.

The whole operating procedures of the CFE module 46 are the same as those if the CFE module 33 in the first embodiment excluding such a point that the memory management table and the DA module 42 are selected according to the disk storage device to be accessed.

Therefore, the explanation of the whole operating procedures will be omitted, and instead details of the individual write-back process will be described.

Figure 9:
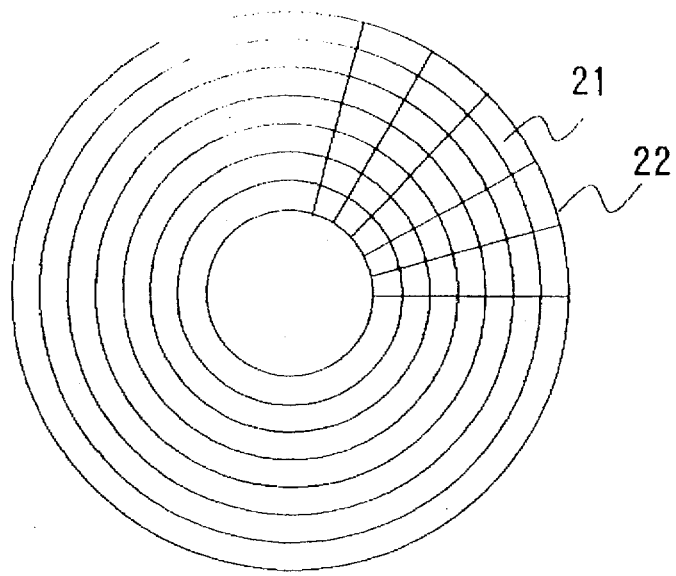
FIG. 9 is an explanatory diagram illustrating a disk medium incorporated into a disk storage device.
Figure 10:
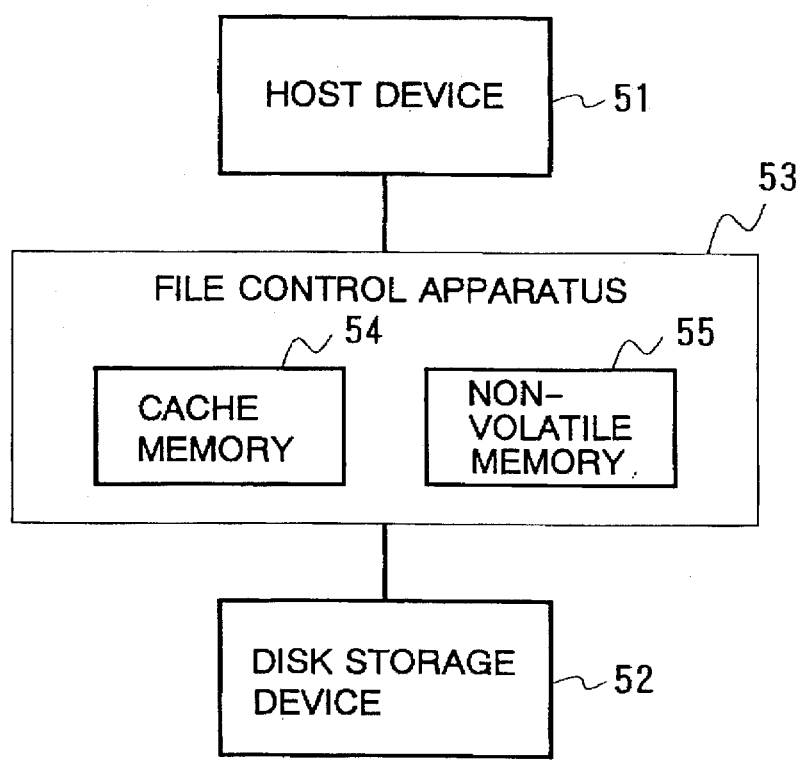
FIG. 10 is a block diagram illustrating a construction of a prior art file control apparatus.

FIG. 9 shows the operating procedures of the CFE module 46 during the individual write-back process. As mentioned earlier, this individual write-back process is executed when notified of a failure in writing the data from the disk storage device 52 through the DA module 42 during the execution of the batch write-back process. That is, this individual write-back process is executed in step corresponding to step S309 of FIG. 6.

As shown in the Figure, when in the individual write-back process, the CFE module 46 at first sends a predetermined command to the DA module 42 that has given a notice of the abnormality, thereby obtaining a track number $M_{ERR}$ of the track where an error occurs out of the DA module 42 (step S401). Incidentally, in the case of an error with an unknown track number $M_{EER}$, the CFE module 46 sets a first track number $M_S$ of the batch write-back processing target track to $M_{EER}$. Then, the CFE module 46 sets the same value as $M_{EER}$ to a variable $M_{CHK}$ (step S402).

Subsequently, the CFE module 46 adds "1" to $M_{CHK}$ (step S403) and decides whether or not $M_{CHK}$ is $M_{MAX}$ or under (step S404). Note that $M_{MAX}$ is a track number of the last track among the series of tracks where the under (step S404). Note that $M_{MAX}$ is a track number of write-back is determined during the batch write-back process.

Then, if $M_{CHK}$ is $M_{MAX}$ or smaller (step S404; Y), the CFE module 46 indicates the DA module 42 to write back the track data about the track number $M_{CHK}$ (step S405).

That is, the CFE module 46 notifies the DA module $42_x$ (X=A or B) of the track number $M_{CHK}$, this module being connected to the disk storage device set as an accessing target at that time. The CFE module 46 also notifies the DA module $42_x$ of the block number of the block stored with the track data about the track number $M_{CHK}$. The DA module $42_x$ receiving such notices indicates the disk storage device $52_x$ to write the one-track data on the track having the track number $M_{CHK}$. Next, the DA module $42_x$ supplies the disk storage device $52_x$ with the track data stored on the block having the notified block number in the cache memory 47. Thereafter, the DA module $42_x$ transfers, to the CFE module 46, a notice of a normality end or a notice of the occurrence of abnormality which are outputted from the disk storage device $52_x$.

When receiving the notice of the occurrence of abnormality (step S406; N), the CFE module 46 stores the track number of the track where the write-back process is fails to perform (step S407) and returns to step S403. On the other hand, when receiving the notice of normality end (step S406; Y), the CFE module 46 directly executes the processes from step S403.

The CFE module 46, when $M_{CHK}>M_{MAX}$ (step S404; N), exists a loop of steps S403–S407. That is, the CFE module 46, when completing the write-back process to the last track among the series of batch write-back processing target tracks, exists the same loop and executes step S408.

In step S408, the CFE module 46 effects the process of changing, to "0", the write-back requirement indicating flag about the block where the write-back process has been normally ended. Note that in this step "0" is set to the write-back requirement indicating flag relative to the block where the data has been written back in step S405 and the block where the data has been written back in the batch write-back process (i.e., the blocks ranging from the track number $M_S$ to the track number $M_{ERR}-1$).

Thereafter, the CFE module 46 notifies the host device 51 of the occurrence of the abnormality, which has made the request (step S409) and finishes the individual write-back process.

Thus, according to the file control apparatus in the second embodiment, when failing to write back the data during the batch write-back process, the write-back process is executed on the respective tracks subsequent to the track where the data has failed to write back. Therefore, the tracks possible of the write-back process are not treated as the write-back pending tracks, and hence, according to the present file control apparatus, the memory areas of the disk storage device can be efficiently used.

Incidentally, the file control apparatus in the second embodiment is constructed to write back the data to only the tracks after the track where the error happens but may be, as a matter of course, constructed to individually write back the data to all the batch write-back processing target tracks.

It is apparent that, in this invention, a wide range of different working modes can be formed based on the invention without deviating from the spirit and scope of the invention. This invention is not restricted by its specific working modes except being limited by the appended claims.

What is claimed is:

1. A file control apparatus provided between a disk storage device and a host device for accessing data in said disk storage device, said apparatus comprising:

storing means having a predetermined number of blocks for storing track data consisting of plural pieces of sector data;

first read request responding means for supplying, when receiving a read request from said host device, and if said storing means is stored with the sector data about a read requested sector requested of reading with respect to the read request therefrom, said host device with the sector data within said storing means;

second read request responding means for, when receiving the read request from said host device, and if said storing means is not stored with the sector data about the read requested sector requested of reading with respect to the read request therefrom, reading the track data containing the sector data about the read requested sector from said disk device, storing an empty block within said storing means with the read track data and supplying said host device with the sector data about the read requested sector that is contained in the track data;

write-back request responding means for, when receiving a write request from said host device, and if said storing means is stored with the sector data about a write requested sector requested of writing with respect to the write request therefrom, rewriting the sector data with data requested of writing and storing the effect that the track data containing the sector data are the track data required to be written back; and batch write-back means for, when making a response to the read request given by said second read request responding means in a state where said storing means has no empty block, selecting one block that is to be an empty block in accordance with a predetermined rule, writing, if the selected block is stored with the track data required to be written, a series of track data containing the above track data and to be written back to the consecutive tracks within said storing means back to said disk storage device and storing the effect that each piece of track data which has been written back is data requiring no write-back process.

2. A file control apparatus according to claim 1, wherein said batch write-back means includes:

block selecting means for, when making the response to the read request given by said second read request responding means in the state where said storing means has no empty block, selecting one block that is to be an empty block in accordance with the predetermined rule;

retrieving means for, if the block selected by said block selecting means is stored with the track data required to be written back, retrieving the series of track data containing the track data and to be written back to the consecutive tracks from said storing means;

disk storage device control means for indicating said disk storage device to write the series of track data retrieved by said retrieving means and supplying said disk storage device with the series of track data; and abnormality occurrence notifying means for, when outputting a notice showing that said disk storage device could not normally write the data, notifying said host device of an occurrence of abnormality.

3. A file control apparatus according to claim 2, wherein said batch write-back means further includes:

individual write indicating means for, when outputting the notice showing that said disk storage device could not normally write the data, outputting, to said disk storage device, a write indication to write each piece of the series of track data retrieved by said retrieving means, and wherein said abnormality occurrence notifying means notifies said host device of the occurrence of abnormality after said individual write indicating means has operated.

4. A file control apparatus according to claim 3, wherein said batch write-back means further includes:

obtaining means for, when outputting the notice showing that said disk storage device could not normally write the data, obtaining, from said disk storage device, a piece of track specifying data for specifying the track where the data could not normally be written; and individual write indicating means for outputting, to said disk storage device, a write indication to write the respective pieces of track data subsequent to a track next to the track specified by the track specifying data obtained by said obtaining means among the series of track data retrieved by said retrieving means, and wherein said abnormality occurrence notifying means notifies said host device of the occurrence of abnormality after said individual write indicating means has operated.

5. A file control apparatus according to claim 4, wherein said storing means is constructed of a cache memory and a non-volatile memory that are stored with the same track data.

6. A file control apparatus according to claim 1, further comprising:

standby system second read request responding means having the same construction as that of said second read request responding means and operating when an abnormality happens in said second read request responding means; and standby system batch write-back means having the same construction as that of said batch write-back means and operating when the abnormality happens in said batch write-back means.

7. A data transferring method of transferring data between a disk storage device, a host device for accessing the data in said disk storage device and a memory device having a predetermined number of blocks for storing track data consisting of plural pieces of sector data, said method comprising:

a first read request responding step of supplying, when receiving a read request from said host device, and if said memory device is stored with the sector data about a read requested sector requested of reading with respect to the read request therefrom, said host device with the sector data within said memory device;

a second read request responding step of, when receiving the read request from said host device, and if said memory device is not stored with the sector data about the read requested sector requested of reading with respect to the read request therefrom, reading the track data containing the sector data about the read requested sector from said disk device, storing an empty block within said memory device with the read track data and supplying said host device with the sector data about the read requested sector that is contained in the track data;

a write-back request responding step of, when receiving a write request from said host device, and if said memory device is stored with the sector data about a write requested sector requested of writing with respect to the write request therefrom, rewriting the sector data with data requested of writing and storing the effect that the track data containing the sector data are the track data required to be written back; and a batch write-back step of, when making a response to the read request in said second read request responding step in a state where said memory device has no empty block, selecting one block that is to be an empty block in accordance with a predetermined rule, writing, if the selected block is stored with the track data required to be written, a series of track data containing the above track data and to be written back to the consecutive tracks within said memory device back to said disk storage device and storing the effect that each piece of track data which has been written back is data requiring no write-back process.

8. A data transferring method according to claim 7, wherein said batch write-back step includes:

a block selecting step of, when making the response to the read request in said second read request responding step in the state where said memory device has no empty block, selecting one block that is to be an empty block in accordance with the predetermined rule;

a retrieving step of, if the block selected in said block selecting step is stored with the track data required to be written back, retrieving the series of track data containing the track data and to be written back to the consecutive tracks from said memory device;

a disk storage device control step of indicating said disk storage device to write the series of track data retrieved in said retrieving step and supplying said disk storage device with the series of track data; and an abnormality occurrence notifying step of, when outputting a notice showing that said disk storage device could not normally write the data, notifying said host device of an occurrence of abnormality.

9. A data transferring method according to claim 8, wherein said batch write-back step further includes:

an individual write indicating step of, when outputting the notice showing that said disk storage device could not normally write the data, outputting, to said disk storage device, a write indication to write each piece of the series of track data retrieved in said retrieving step, and wherein said abnormality occurrence notifying step is to notify said host device of the occurrence of abnormality after said individual write indicating step has been executed.

10. A data transferring method according to claim 8, wherein said batch write-back step further includes:

an obtaining step of, when outputting the notice showing that said disk storage device could not normally write the data, obtaining, from said disk storage device, a piece of track specifying data for specifying the track where the data could not normally be written; and an individual write indicating step of outputting, to said disk storage device, a write indication to write the respective pieces of track data subsequent to a track next to the track specified by the track specifying data obtained in said obtaining step among the series of track data retrieved in said retrieving step, and wherein said abnormality occurrence notifying step is to notify said host device of the occurrence of abnormality after said individual write indicating step has been operated.

11. A data transferring method according to claim 10, wherein said memory device is constructed of a cache memory and a non-volatile memory that are stored with the same track data.

* * * * *

UNITED STATES PATENT AND TRADEMARK OFFICE
CERTIFICATE OF CORRECTION

PATENT NO. : 5,727,183
DATED : March 10, 1998
INVENTOR(S) : Takahashi

It is certified that error appears in the above-identified patent and that said Letters Patent is hereby corrected as shown below:

Title Page [75], change "Kanagawa," to --Kawasaki,--.

Col. 16,      line 4, delete "under (step S404)."

line 5, delete "Note that $M_{MAX}$ is a track number of ".

Signed and Sealed this

Twenty-third Day of June, 1998

Attest:

BRUCE LEHMAN

Attesting Officer      Commissioner of Patents and Trademarks